United States Patent Office 3,335,073
Patented Aug. 8, 1967

3,335,073
METHOD OF MAKING ANODIZED TANTALUM FOIL
Cecil G. Dunn, Scotia, N.Y., assignor to General Electric Company, a corporation of New York
No Drawing. Filed Dec. 27, 1963, Ser. No. 334,048
3 Claims. (Cl. 204—29)

ABSTRACT OF THE DISCLOSURE

A process for producing tantalum foil for capacitor use which has a more flaw free surface than heretofore is described in which the cold rolling operation is preceded by the formation of an amorphous oxide film on the surface of the tantalum so that during cold working the metal is protected by the oxide film.

---

This invention relates to tantalum foils for use in electrolytic capacitors and more particularly to a process for producing foils having improved oxide dielectric films.

Modern electrolytic capacitors are commonly made by simultaneously winding a plurality of elongated strips of metal foil, at least one of which has an oxide covered surface, and correspondingly dimensioned and shaped strips of gauze into a cylindrically shaped coil, the gauze acting as a separator between adjacent layers of the foil. In these capacitors, the oxide film acts as a dielectric while the gauze is saturated or impregnated with a suitable electrolyte. The composite coil is enclosed within a suitably closed receptacle which acts to prevent drying of the electrolyte.

It is a principal object of this invention to provide a process for preparing tantalum foil which process enables improved oxide dielectric films to be obtained.

Other objects and advantages of this invention will be in part obvious and in part explained by reference to the accompanying specification.

The failures caused by oxide film breakdown have been particularly troublesome in the manufacture of tantalum foil capacitors. Units manufactured in seemingly identical fashion and of apparently identical materials, for some inexplicable reason, may vary measurably in performance characteristics. It has now been found that flaws in tantalum oxide films formed anodically on tantalum surfaces are thin spots in the film. Apparently, if the surface of the tantalum contains regions on which film formation is strongly hindered for some reason, then these regions can be surrounded by growth of the film parallel to the surface. The film thickness in the region of a flaw is diminished relative to flaw-free regions because the electric field must pull tantalum ions from outside the region of the flaw into its center. Thus, from such migration of tantalum, an annular depression is created on the metal surface surrounding the flaw as a result of the added metal consumption in that region, which must supply tantalum to the film being formed both immediately above itself and also above the flaw. In all likelihood there is a gap between the metal and the oxide film under the region of thin oxide film at a flaw site.

Tantalum thin foils, thin foils being those that range from less than 1 mil in thickness up to about 10 mils in thickness, are normally produced by cold rolling a starting ingot or body down to some desired final thickness, and thereafter effecting an anodizing treatment to develop the oxide dielectric film.

The present process renders it possible to obtain a higher quality final anodic film than has generally been previously possible on tantalum in the as-rolled condition. Generally, the invention comprises forming an oxide film on a starting body of tantalum so that when the body is cold rolled to final gauge the roll surfaces and particularly asperities in the surfaces of the rolls, will be isolated from actual contact with the tantalum metal. The applied oxide film must be strongly adherent and must be the amorphous rather than the crystalline oxide. If these conditions are not met, then the effect is the opposite of that intended, specifically, the final anodic dielectric film will contain a larger percentage of flaws and therefore lower breakdown strength. Cleaning treatments may be used before the penultimate anneal that insure both the strongly adherent amorphous oxide and a film nearly free of flaws on forming the film prior to the last stage of rolling. Strongly adherent amorphous oxide films on the surface of the body being rolled deform plastically during cold rolling, but more uniformly below 1000 A. than above 1000 A. Generally, an oxide film thickness of about 200 A. or greater provides adequate separation between tantalum and the rolls while insuring adequate plasticity during rolling operations.

Two groups of specimens were prepared, one group being prepared according to standard procedures without the use of the novel step of this invention and the second group with the application of an amorphous oxide film prior to cold rolling. Specifically, annealed tantalum sheet 0.010 inch thick was cold rolled to 0.0025 inch thickness with and without the addition of an amorphous tantalum oxide film. The cold reduction was effected at rates of about 20 percent reduction in thickness per pass.

Samples which had an amorphous tantalum oxide film formed on them prior to cold rolling were given this film by anodizing the 0.010 inch thick tantalum sheet to 25 volts in a $\frac{1}{10}$ weight percent phosphoric acid solution for about 5 minutes. This treatment produced an amorphous film of about 450 A. thickness. Additionally, anodization was repeated after a 50 percent reduction in thickness in order to maintain the film thickness during rolling above 200 A. The thickness of the oxide film required to be formed on the tantalum depends principally upon the surface roughness of the rolls, but should be kept minimal for most satisfactory coverage while still preventing contact between the mill and the tantalum.

Samples of the original 0.01 inch starting material given the additional amorphous oxide film and those cold rolled in the standard annealed form, were, after reduction to final thickness, degreased and anodized to 220 volts D.C. in a $\frac{1}{10}$ weight percent phosphoric acid solution at room temperature. This anodization treatment was effected for 1 hour. Additionally, samples of original 0.010 inch thickness were treated in the same manner but without any rolling to test the effect of the rolling operation on the quality of the final dielectric film.

Observation of the surfaces of the specimens after final anodization indicated: (1) a low flaw density in the anodic film formed on initial, as-annealed 0.01 inch tantalum sheet; (2) many flaws in anodic film formed on samples rolled with no added tantalum oxide film; and (3) relatively few flaws in the anodic film formed on those samples which had been protected by the additional amorphous oxide film. More quantitatively, the following table shows the effect of the flaws on leakage current, the leakage current being taken one minute after establishing a 150 volt potential across the film by rendering the tantalum anodic and placing it within a liquid electrolyte which served as the cathode.

Table I

| Sample: | Leakage-microamps/in.$^2$ |
|---|---|
| (1) .010″ annealed and anodized | 0.13 |
| (2) .0025″ rolled with added $Ta_2O_5$ | 0.22 |
| (3) .0025″ rolled with added $Ta_2O_5$ | 0.27 |
| (4) .0025″ rolled without added $Ta_2O_5$ | 2.8 |
| (5) .0025″ rolled without added $Ta_2O_5$ | 2.9 |

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A process for producing tantalum foil for use in electrolytic capacitors comprising, forming by anodization an adherent film of amorphous tantalum oxide on the surface of the tantalum, cold rolling the oxide coated tantalum to a desired final thickness, and thereafter anodizing the tantalum foil to form a dielectric tantalum oxide film.

2. In the process for producing tantalum foil for use in electrolytic capacitors from a tantalum starting body in which tantalum foil is cold rolled to a desired final thickness, and subsequently anodized to develop a dielectric oxide film, the improvement comprising anodizing the tantalum starting body prior to cold rolling to form an adherent, amorphous tantalum oxide film on the surface thereof.

3. A process as defined in claim 2 wherein the amorphous tantalum oxide film is at least 200 A. in thickness.

References Cited

UNITED STATES PATENTS

| | | | |
|---|---|---|---|
| 1,899,419 | 2/1933 | Kerk | 204—56 X |
| 2,057,315 | 10/1936 | Robinson | 204—35 |

FOREIGN PATENTS 455,077  10/1936  Great Britain.

JOHN H. MACK, *Primary Examiner.*

HOWARD S. WILLIAMS, *Examiner.*

G. KAPLAN, *Assistant Examiner.*